United States Patent
Lee et al.

(10) Patent No.: US 8,029,403 B2
(45) Date of Patent: Oct. 4, 2011

(54) MULTI-SPEED TRANSMISSION WITH SELECTABLE ONE-WAY BRAKING CLUTCH

(75) Inventors: Chunhao J. Lee, Troy, MI (US); Farzad Samie, Franklin, MI (US); Chi-Kuan Kao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 271 days.

(21) Appl. No.: 12/404,683

(22) Filed: Mar. 16, 2009

(65) Prior Publication Data

US 2010/0234167 A1   Sep. 16, 2010

(51) Int. Cl.
*F16H 3/62* (2006.01)
(52) U.S. Cl. ........ 475/276; 475/271; 475/283; 475/289; 475/318; 475/330
(58) Field of Classification Search .................. 475/269, 475/271, 275, 277, 282, 283, 288, 289, 317, 475/318, 330
See application file for complete search history.

(56) References Cited

U.S. PATENT DOCUMENTS

| | | | |
|---|---|---|---|
| 7,128,683 B2* | 10/2006 | Oguri et al. | 475/276 |
| 7,198,587 B2 | 4/2007 | Samie et al. | |
| 2008/0009384 A1 | 1/2008 | Diosi et al. | |
| 2008/0064556 A1 | 3/2008 | Kamm et al. | |
| 2008/0113844 A1* | 5/2008 | Baldwin | 475/276 |
| 2008/0300093 A1* | 12/2008 | Borgerson | 475/276 |

* cited by examiner

*Primary Examiner* — David D Le
*Assistant Examiner* — Huan Le
(74) *Attorney, Agent, or Firm* — Quinn Law Group, PLLC

(57) ABSTRACT

A multi-speed transmission for a vehicle is provided with a selectable one-way braking clutch (SOWBC). The transmission has an input member connected for common rotation with one of the members of four planetary gear sets and an output member connected for common rotation with another of the members of the planetary gear sets. Four interconnecting members connect different members of the planetary gear sets for common rotation. A first brake is selectively engagable to ground the first member of the first planetary gear set to the stationary member. A first, a second, and a third rotating clutch are each selectively engagable to connect a different respective pair of the members of the planetary gear sets for common rotation. A selectable one-way braking clutch is configured to brake in one rotational direction and is selectively reversible to brake in an opposite rotational direction, and freewheels in some speed ratios.

12 Claims, 4 Drawing Sheets

|      | 66 | 68      |         | 64 | 60 | 62 |
|------|----|---------|---------|----|----|----|
|      |    | Power   | Eng-brk |    |    |    |
| Rev  | X  | R       | F       |    |    | X  |
| 1st  | X  | F       | R       |    | X  |    |
| 2nd  | X  | F       | R       | X  |    |    |
| 3rd  |    | F       | R       | X  | X  |    |
| 4th  |    | F       | R       | X  |    | X  |
| 5th  |    | F       | R       |    | X  | X  |
| 6th  |    | F/Neu   | F/Neu   | X  | X  | X  |
| 7th  | X  | F/Neu   | F/Neu   |    | X  | X  |
| 8th  | X  | F/Neu   | F/Neu   | X  |    | X  |
FIG. 2
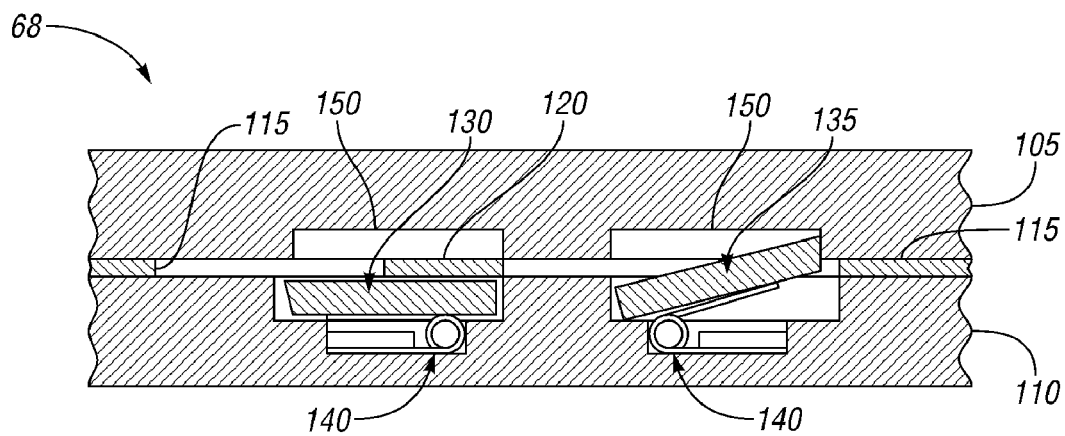
FIG. 3
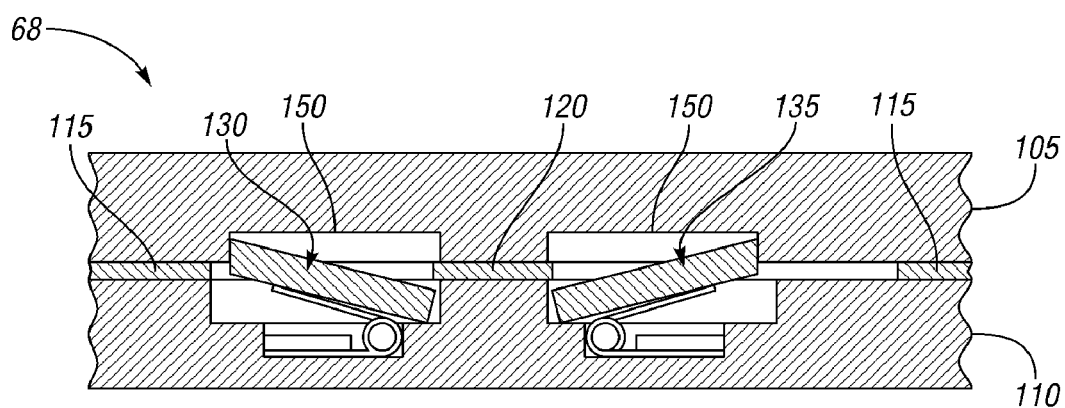
FIG. 4

MULTI-SPEED TRANSMISSION WITH SELECTABLE ONE-WAY BRAKING CLUTCH

TECHNICAL FIELD

The invention relates to a multi-speed transmission having a selectable one-way braking clutch.

BACKGROUND OF THE INVENTION

Some automatic transmissions include a low/reverse braking clutch (i.e., a friction brake) that is applied in both a reverse speed ratio and a first forward speed ratio in order to provide reaction torque in both forward and reverse directions. Alternatively, a braking clutch is sometimes used alongside a one-way clutch, with the one-way clutch preventing rotation of a transmission component, such as a carrier member, in either the first or reverse speed ratio, and the braking clutch applied to prevent rotation in the other of the first and the reverse speed ratio. This type of one-way clutch is not selectable, in that it always automatically brakes one direction of rotation of the transmission component and freewheels, i.e., permits the component to rotate, in the opposing direction.

Automatic, multi-speed transmissions that incorporate planetary gear sets typically include multiple friction-type clutches in order to manipulate the transmission to provide many forward speed ratios. Many such components are necessary to provide six, seven, or eight forward speed ratios. The planetary gear sets and clutches become increasingly difficult to package as they increase in number, and also add to the overall weight of the transmission.

As is commonly known to those familiar with the art, disengaged multi-plate friction clutches, depending on various conditions, produce drag when there is relative motion between the sets of clutch plates. One characteristic of a disengaged multi-plate clutch is that, as the relative speed between the sets of clutch plates increases, typically, so does the drag or spin loss. This spin loss contributes to decreased fuel economy.

SUMMARY OF THE INVENTION

A multi-speed transmission for a vehicle is provided that has a selectable one-way braking clutch (SOWBC) in order to reduce part complexity, weight, cost, and spin losses. The SOWBC is selectable so that it can provide reaction force against rotation in either rotational direction. Additionally, the selectability allows the SOWBC to freewheel in appropriate speed ratios. The transmission has an input member, an output member, and a stationary member, such as the transmission case. Four planetary gear sets are included, each having a first, a second, and a third member. The input member is connected for common rotation with one of the members of the planetary gear sets and the output member is connected for common rotation with another of the members of the planetary gear sets. A first interconnecting member connects the first member of the first planetary gear set for common rotation with the first member of the second planetary gear set. A second interconnecting member connects the second member of the first planetary gear set for common rotation with the first member of the fourth planetary gear set. A third interconnecting member connects the second member of the second planetary gear set for common rotation with the first member of the third planetary gear set. A fourth interconnecting member connects the second member of the third planetary gear set for common rotation with the second member of the fourth planetary gear set. A first brake is selectively engagable to ground the first member of the first planetary gear set to the stationary member. A first, a second, and a third rotating clutch are each selectively engagable to connect a different respective pair of the members of the planetary gear sets for common rotation. The SOWBC is configured to brake in one rotational direction and is selectively reversible to brake in an opposite rotational direction.

The brake, rotating clutches and selectable one-way braking clutch may be engaged in combinations of three to establish one reverse speed ratio and eight forward speed ratios between the input member and the output member. The SOWBC is configured to brake rotation of the third member of the first planetary gear set when the transmission is in the reverse and in a first of the forward speed ratios, and is configured to freewheel in at least some of the other forward speed ratios, permitting rotation of the third member of the first planetary gear set.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a table indicating an engagement schedule for the transmission of FIG. 1;

FIG. 3 is a schematic cross-sectional fragmentary illustration of the SOWBC of FIG. 1 selected for braking of forward rotation;

FIG. 4 is a schematic cross-sectional fragmentary illustration of the SOWBC of FIG. 1 selected for braking of both reverse rotation and forward rotation;

DESCRIPTION OF THE PREFERRED EMBODIMENTS

Figure 1:
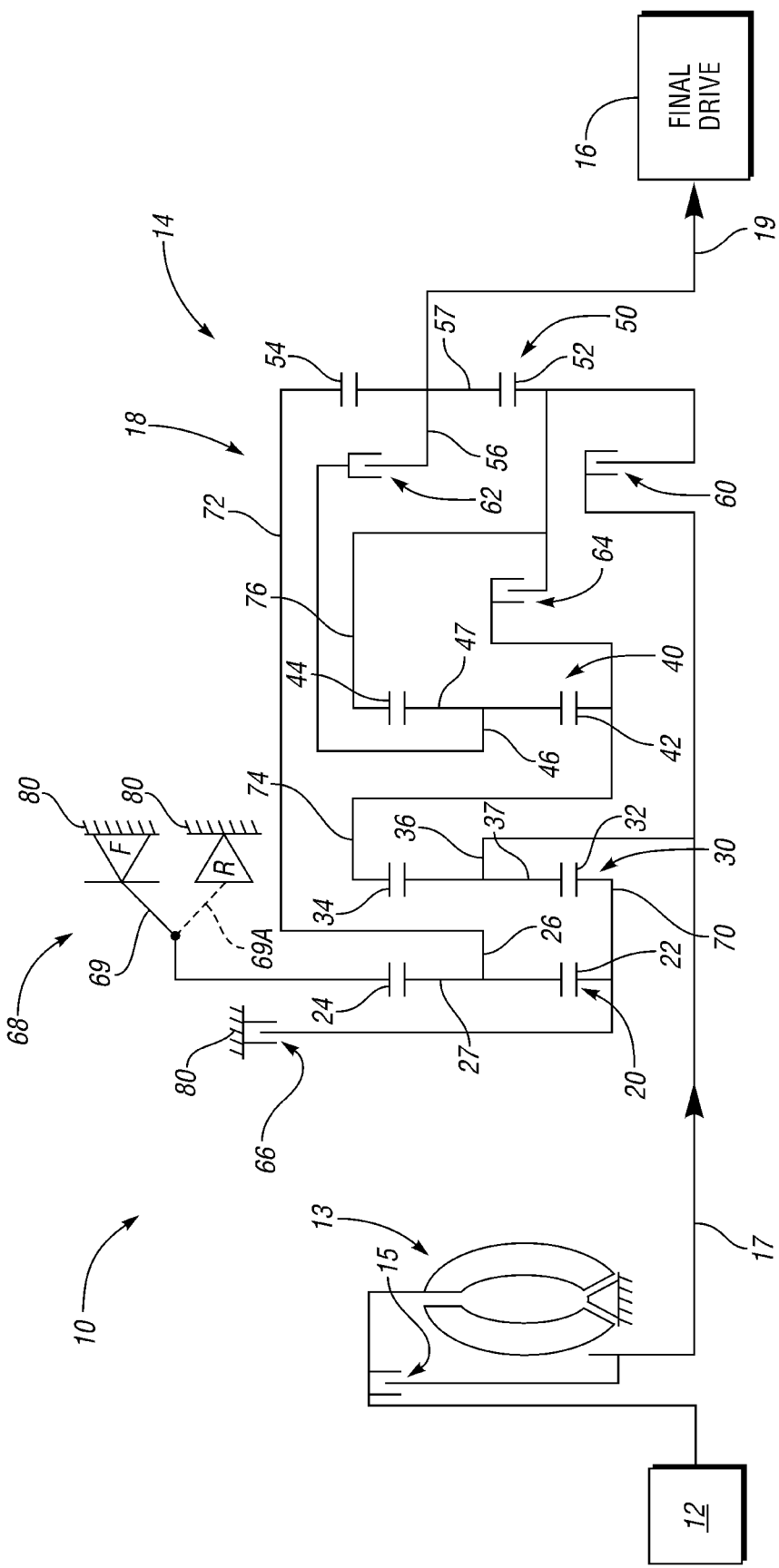
FIG. 1 is a schematic illustration in stick diagram form of a first embodiment of a transmission having an SOWBC.

Referring to the drawings, wherein like reference numbers refer to like components throughout the several views, FIG. 1 schematically illustrates an exemplary powertrain 10 that includes an engine 12, a planetary transmission 14, and a final drive mechanism 16.

The planetary transmission 14 includes an input member 17 operatively connected with the engine 12, a planetary gear arrangement 18, and an output member 19 continuously connected with the final drive mechanism 16. A torque converter 13 with a lockup clutch 15, as is typical, may be positioned between the engine 12 and the input member 17. The lockup clutch 15 may be engaged when operating conditions warrant a direction connection between the engine 12 and the input member 17. If no torque converter is present, then an isolator may be positioned between the engine 12 and the input member 17. The planetary gear arrangement 18 includes four planetary gear sets 20, 30, 40 and 50.

The first planetary gear set 20 includes a sun gear member 22, a ring gear member 24, and a planet carrier member 26. A plurality of pinion gears 27 are rotatably mounted on the planet carrier member 26 and disposed in meshing relationship with both the sun gear member 22 and the ring gear member 24.

The second planetary gear set 30 includes a sun gear member 32, a ring gear member 34, and a planet carrier member 36. A plurality of pinion gears 37 are rotatably mounted on carrier member 36 and disposed in meshing relationship with both the sun gear member 32 and the ring member 34.

The third planetary gear set 40 includes a sun gear member 42, a ring gear member 44, and a planet carrier member 46. A plurality of pinion gears 47 are rotatably mounted on carrier member 46. The pinion gears 47 are disposed in meshing relationship with the sun gear member 42 and with the ring gear member 44.

The fourth planetary gear set 50 includes a sun gear member 52, a ring gear member 54, and a planet carrier member 56. A plurality of pinion gears 57 are rotatably mounted on carrier member 56. The pinion gears 57 are disposed in meshing relationship with the sun gear member 52 and with the ring gear member 54.

The planetary gear arrangement 18 also includes five torque-transmitting mechanisms 60, 62, 64, 66 and 68. The torque-transmitting mechanisms 60, 62, 64 are rotating-type torque-transmitting mechanisms, commonly termed clutches. Clutches 60, 62, and 64 are multi-plate clutch devices, for example, in a friction launch configuration. The torque-transmitting mechanism 66 is a stationary-type torque-transmitting mechanism, commonly termed a brake or reaction clutch. The torque-transmitting mechanism 68 is an SOWBC, discussed in greater detail below with respect to FIGS. 3, 4, and 5.

The input member 17 is continuously connected with the carrier member 36, and the output member 19 is continuously connected with the carrier member 56. Interconnecting member 70 is a hub continuously connecting sun gear member 22 for common rotation with sun gear member 32. Interconnecting member 72 is a hub continuously connecting carrier member 26 for common rotation with ring gear member 54. Interconnecting member 74 is a hub continuously connecting ring gear member 34 for common rotation with sun gear member 42. Interconnecting member 76 is a hub continuously connecting ring gear member 44 for common rotation with sun gear member 52.

The carrier member 36 is selectively connectable with the sun gear member 52 by engagement of the clutch 60. The carrier member 46 is selectively connectable with the carrier member 56 by engagement of the clutch 62. The sun gear member 42 is selectively connectable with the sun gear member 52 by engagement of the clutch 64. The sun gear member 22 is selectively grounded to a stationary member, the transmission housing 80, by engagement of the brake 66. The transmission housing 80 is shown only in fragmentary view, but surrounds the planetary gear sets 20, 30, 40, 50. The ring gear member 24 is selectively grounded to the transmission housing 80 by engagement of the SOWBC 68.

FIG. 2 is a clutching table, describing operation of the clutches of transmission 14 in various gear states. In the table of FIG. 2, an "X" denotes an engaged clutch. With respect to the SOWBC 68, "R" stands for reverse, "F" stands for forward, and F/Neu stands for freewheeling in the forward direction of rotation. The torque-transmitting mechanisms 60, 62, 64, 66 and 68 are selectively engaged in combinations of three to provide eight forward speed ratios and a reverse speed ratio between the input member 17 and the output member 19. It is clear from FIG. 2 that the SOWBC 68 is engaged both in the reverse (Rev) speed ratio, when power is provided to the output member 19 in a reverse (R) direction of rotation, and when power is provided to the output member 19 in five different forward speed ratios (1st through 5th). Thus, the SOWBC 68 provides reaction torque and prevents forward rotation of the ring gear member 24 in the reverse speed ratio, and provides reaction torque and prevents reverse rotation of the ring gear member 24 in the 1st through 5th forward speed ratios. In the 6th through 8th forward speed ratios, the SOWBC 68 freewheels (i.e., the ring gear member 24 spins in a forward direction of rotation, with the SOWBC 68 in the braking reverse state).

The SOWBC 68 is shown schematically in FIG. 1, with a switch element 69 selected to the forward braking position. This position is selected in the Reverse speed ratio, and causes the stationary member 80 to provide reaction torque and prevents rotation of the ring gear member 24 in the forward direction. In the reverse braking position of FIG. 3, the SOWBC 68 will freewheel to allow the ring gear member 24 to rotate in the forward direction if the engagement of selected ones of the other clutches 60, 62, 64 and brake 66 places torque in the reverse direction on the ring gear member 24, such as in the sixth, seventh, and eighth forward speed ratios.

The switch element 69 is selectively movable to the reverse braking position, shown in phantom as 69A. This position is selected in the first through fifth forward speed ratios, and provides reaction torque preventing rotation of the ring gear member 24 in the reverse direction. The reverse position of the SOWBC 68, braking both forward and reverse rotation, is shown in FIG. 4. The first member 105, representing an outer race of the SOWBC 68 is splined to a spline on the transmission housing 80. The second member 110 is an inner race of the SOWBC 68 splined to the ring gear member 24. A snap ring may be used to keep the SOWBC 68 in place.

The SOWBC 68 may be a controllable mechanical diode clutch or a selectable roller clutch design or other selectable (reversible) one-way clutches. The SOWBC may be hydraulically actuated by a piston and a valve. A number of clutch designs capable of functioning as an SOWBC are envisioned, and this disclosure is not intended to be limited to the particular exemplary embodiments described herein.

Several methods are known to implement an SOWBC. Struts, rockers, rollers, or sprags are different features that can be utilized to selectively couple or decouple the members of the clutch. FIGS. 3 and 4 illustrate in cross-section an SOWBC selecting between forward-locked and reversed-locked operation (FIG. 4) and reverse-locked, forward freewheeling operation (FIG. 3), in accordance with the present disclosure. SOWBC feature 68 comprises the first member 105, the second member 110, a selector plate 115, a selector plate actuation feature 120, a first engagement element 130, a second engagement element 135, two return springs 140, and two engagement features 150. The second member 110 and the selector plate 115 can be rotatable features centered around a common axis of rotation (not shown, but established by the input member 17 of FIG. 1). The members 105 and 110 may be flat circular plates. Selector plate 115 is sandwiched between the two members and generally moves or remains fixed with second member 110. Selector plate 115 includes selector plate actuation feature 120. Selector plate 115 is movable relative to first member 105 by some small rotational angle, so as to provide calibrated movement of selector plate actuation feature 120. Engaging elements 130 and 135, illustrated as struts in this exemplary embodiment, are rotatingly located to second member 110, are oriented substantially normally to the radius of the member 110, and provide the selective coupling and decoupling functions served by the SOWBC 68. Each engaging element, when in an up position, fixedly fits against an engagement feature 150 in first member 105 and prevents second member 110 from rotating relative to first member 105 in one direction. The engagement elements are normally in an up position due to forces exerted by return springs 140. Selector plate 115 can be actuated relative to the engaging elements, such that selector plate actuation feature 120 can be used to depress one of the engagement elements into a down position. The action of the engagement to stop relative rotation depends upon the geometry of the interacting features. If one of the engagement elements 130, 135 is in a down position, then the clutch can freewheel in the direction normally prohibited by the engagement feature now in the down position.

FIG. 3 illustrates SOWBC 68 with one engagement element in a down position and one engagement element in an up position. Engagement element 135 is in an up position and is fit against an engagement feature 150. As a result, second member 110 cannot rotate to the right relative to first member 105. However, engagement element 130 is in a down position. Engagement feature 135 provides substantially zero resistance to second member 110 rotating to the left relative to first member 105. When relative rotation occurs and first member 105 comes into contact with engagement element 135, pressure upon the top, nearly horizontal surface of engagement element 135 creates a downward rotation of engagement element 135. This ratcheting motion of engagement element 135 can continue as engagement element 135 rotates past subsequent engagement features 150. The state of the SOWBC 68 in FIG. 3 is consistent with the switch 68 selecting the reverse braking position, preventing reverse rotation of the second member 110, and thus ring gear member 24, but allowing second member 110 and thus ring gear member 24 to freewheel in a forward direction of rotation.

FIG. 4 illustrates SOWBC 68 with both engagement elements 130 and 135 in an up position. Selector plate 115 is actuated relative to the engagement elements such that neither engagement element 130 nor engagement element 135 is depressed by actuation feature 120. As a result, rotation of second member 110 in either direction relative to first member 105 is not possible. The state of the SOWBC 68 in FIG. 4 is consistent with the switch 69 selecting the forward braking position, preventing forward rotation of the second member 110, and thus ring gear member 24. Alternatively, a SOWBC could be configured with a selection state allowing freewheeling in both directions.

It will be appreciated that the members of an SOWBC are likely to have a plurality of features like SOWBC 68, each actuated similarly to allow or prevent rotation in either direction, with the total torque transmitted through the SOWBC distributed between the SOWBC features. Similar SOWBC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or both directions of rotation.

Application of an SOWBC, as described above, to an automatic transmission can reduce parts and increase fuel efficiency. Yet, when the SOWBC 68 needs to be engaged, slip across the clutch must substantially equal zero. There can be no relative rotation (i.e., slip) between the members 105, 110; that is, both members 105, 110 of the SOWBC 68 need to be stationary or, in an embodiment where neither is grounded, need to be rotating at the same speed and in the same direction.

Figure 5:
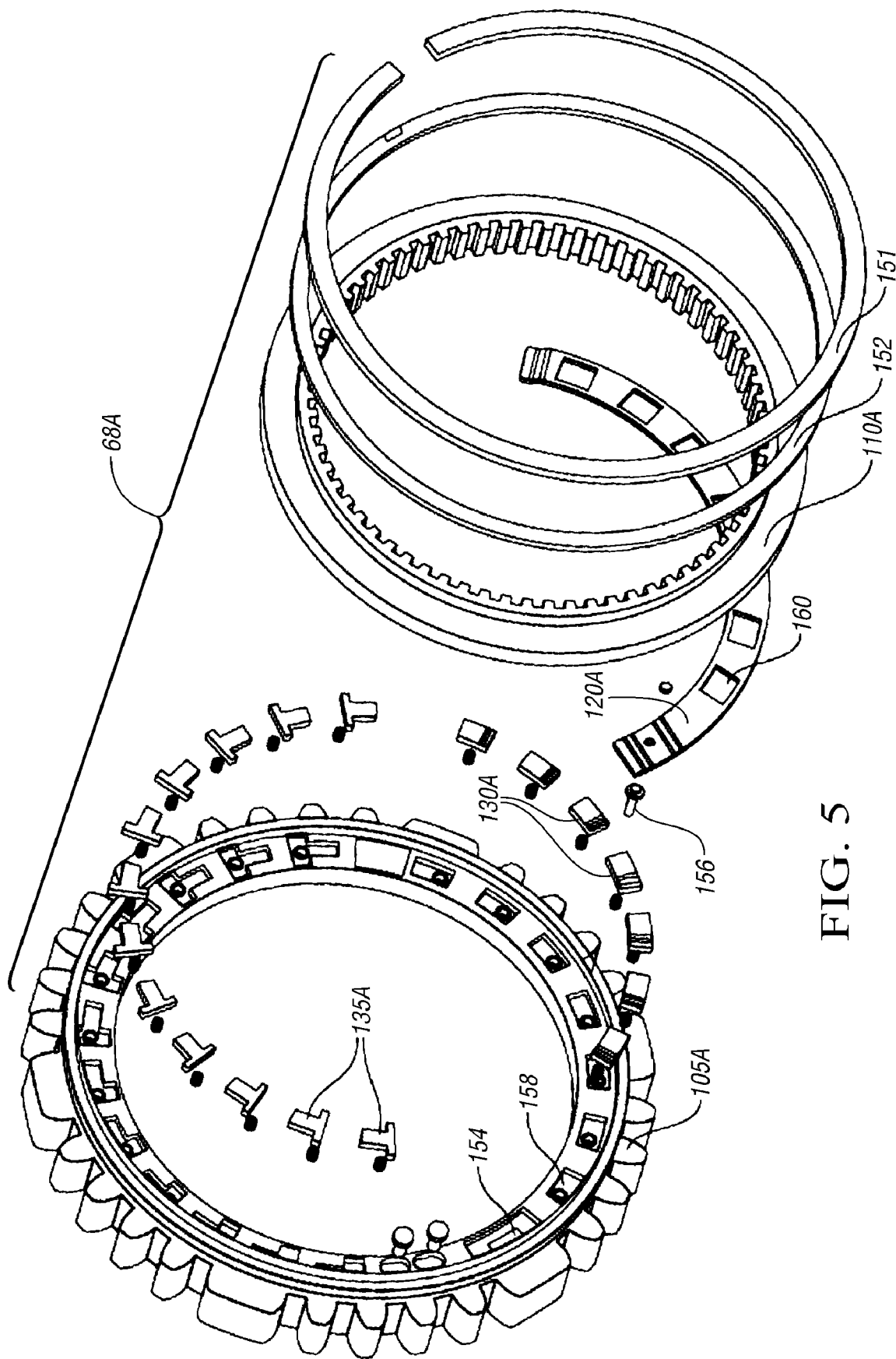
FIG. 5 is a schematic perspective exploded view of an alternative SOWBC for use with the transmission of FIGS. 1 and 6.

FIG. 5 schematically shows an alternative SOWBC 68A substantially similar to SOWBC 68 including a first element as an annular strut plate 105A and a second element as a co-annular notch plate 110A, with a selector plate as a co-annular slide plate 120A interposed therebetween. The SOWBC 68A follows the same engagement schedule as set forth for SOWBC 68 in FIG. 2, when used in lieu of SOWBC 68 in the transmissions 14, 214 of FIGS. 1 and 6, respectively.

The strut plate 105A has a pocket-shaped design including a first side having a race into which the slide plate 120A and the notch plate 110A are assembled and held in place preferably using a snap ring 151 and a supporting ring 152. The strut plate 105A includes a pass-through slot portion 154 formed therein. The pass-through slot portion 154 comprises a circumferentially-oriented elongated opening passing through the strut plate 105A, and can be located on an annular surface of the strut plate 105A, as shown in FIG. 5, and, alternatively, can be located on an outer circumferential surface of the strut plate 105A (not shown). A pin 156 attached through an opening to the slide plate 120A passes through the slot portion 154 and slidably moves therein. In one embodiment, there is a plurality of spring-actuated retractable engagement elements or struts 130A, 135A located in strut pockets 158 located circumferentially within the pocket area of the first side of the strut plate 105A. The notch plate 110A includes a plurality of circumferentially-located notches (not shown) located co-annular to the retractable struts 130A, 135A of the strut plate 105A. The slide plate 120A is configured to slidably move in the annular race of the strut plate 105A, rotating about the common axis. The slide plate 120A includes a plurality of pass-through notch openings 160 corresponding to the retractable struts 130A of the strut plate 105 and the notches of the notch plate 110A. The slide plate 120A includes the pin 156 that projects orthogonally from an annular surface of the slide plate 120A, and passes through the slot portion 154 of the strut plate 105A. The slide plate 120A is configured to rotatably slide with respect to the strut plate 105A about the common axis, with the magnitude of the slidable movement of the slide plate 120A being circumscribed by the movement of the pin 156 and the slot portion 154 of the strut plate 105A. When the slide plate 120A rotatably slides via an actuator (not shown) to a first position with respect to the strut plate 105A, the slide plate 120A is configured to restrain the retractable struts 130A, and the notch plate 110A rotates freely with the ring gear 24 in the forward direction but is braked in the reverse direction. When the slide plate 120A rotatably slides via an actuator (not shown) to a second position with respect to the strut plate 105A, the notch openings 160 of the slide plate 120A are configured to coincide with the retractable struts 130A, allowing them to project therethrough. The retractable struts 130A can engage the notches of the notch plate 110A, and fixedly lock the ring gear 24 of FIG. 1 to the strut plate 105A, stopping it from rotating in either direction.

One skilled in the art can conceive of other configurations for engaging and disengaging the exemplary SOWBCs 68, 68A described herein by actuating and deactivating a displacement actuator using a control module.

Second Embodiment

Figure 6:
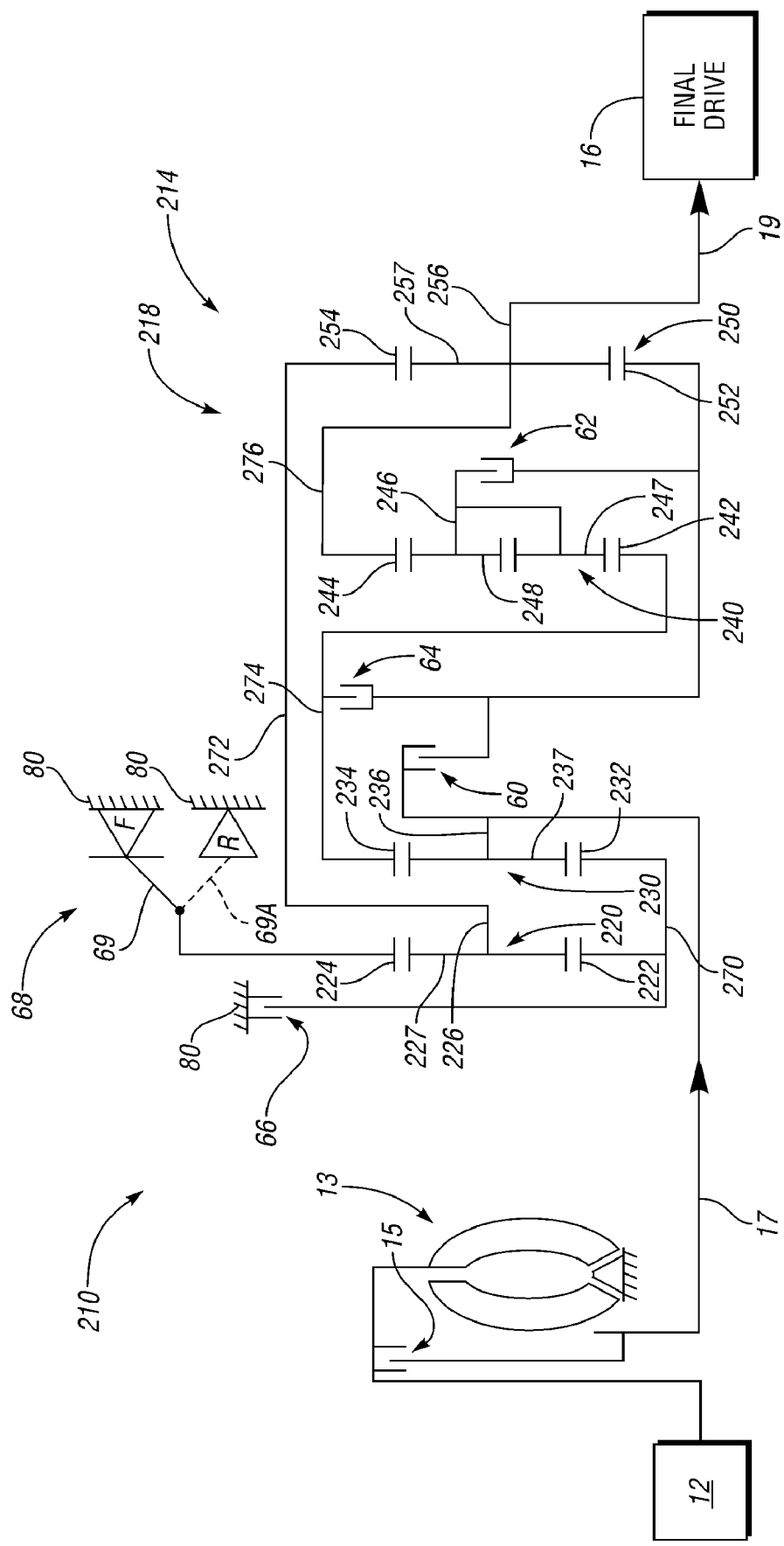
FIG. 6 is a schematic illustration in stick diagram form of a second embodiment of a transmission having an SOWBC.

FIG. 6 shows another embodiment of a powertrain 210. Components of powertrain 210 identical to those of powertrain 10 are referred to with identical reference numbers. The powertrain 210 includes an engine 12, a planetary transmission 214, and a conventional final drive mechanism 16.

The planetary transmission 214 includes an input member 17 continuously connected with the engine 12, a planetary gear arrangement 218, and an output member 19 operatively connected with the final drive mechanism 16. A torque converter 13 with a lockup clutch 15, as is typical, may be positioned between the engine 12 and the input member 17. The lockup clutch 15 may be engaged when operating conditions warrant a direction connection between the engine 12 and the input member 17. If no torque converter is present, then an isolator would be positioned between the engine 12 and the input member 17. The planetary gear arrangement 218 includes four planetary gear sets 220, 230, 240 and 250.

The first planetary gear set 220 includes a sun gear member 222, a ring gear member 224, and a planet carrier member 226. A plurality of pinion gears 227 are rotatably mounted on the planet carrier member 226 and disposed in meshing relationship with both the sun gear member 222 and the ring gear member 224.

The second planetary gear set 230 includes a sun gear member 232, a ring gear member 234, and a planet carrier member 236. A plurality of pinion gears 237 are rotatably mounted on carrier member 236 and disposed in meshing relationship with both the sun gear member 232 and the ring member 234.

The third planetary gear set 240 includes a sun gear member 242, a ring gear member 244, and a planet carrier member 246. A plurality of pinion gears 247 are rotatably mounted on carrier member 246. The pinion gears 247 are disposed in meshing relationship with the sun gear member 242. A second plurality of pinion gears 248 is disposed in meshing relationship with the pinion gears 247 and with the ring gear member 244. This type of planetary gear set is commonly referred to as a double pinion-type planetary gear set.

The fourth planetary gear set 250 includes a sun gear member 252, a ring gear member 254, and a planet carrier member 256. A plurality of pinion gears 257 are rotatably mounted on carrier member 256. The pinion gears 257 are disposed in meshing relationship with the sun gear member 252 and with the ring gear member 254.

The planetary gearing arrangement 218 also includes the five torque-transmitting mechanisms 60, 62, 64, 66 and 68 described above. The input member 17 is continuously connected with the carrier member 236, and the output member 19 is continuously connected with the carrier member 256. Interconnecting member 270 is a hub continuously connecting sun gear member 222 for common rotation with sun gear member 232. Interconnecting member 272 is a hub continuously connecting carrier member 226 for common rotation with ring gear member 254. Interconnecting member 274 is a hub continuously connecting ring gear member 234 for common rotation with sun gear member 242. Interconnecting member 276 is a hub continuously connecting ring gear member 244 for common rotation with carrier member 256.

The carrier member 236 is selectively connectable with the sun gear member 252 by engagement of the clutch 60. The carrier member 246 is selectively connectable with the sun gear member 252 by engagement of the clutch 62. The ring gear member 234 is selectively connectable with the sun gear member 252 by engagement of the clutch 64. The sun gear member 222 is selectively grounded to the transmission housing 80, by engagement of the brake 66. The transmission housing 80 is shown only in fragmentary view, but surrounds the planetary gear sets 220, 230, 240, 250. The ring gear member 224 is selectively grounded to the transmission housing 80 by engagement of the SOWBC 68 to prevent either forward or reverse rotation; i.e., set to either forward braking or reverse braking (but allowing freewheeling in forward when set to reverse braking).

The torque-transmitting mechanisms 60, 62, 64, 66 and 68 are engagable according to the same schedule as set forth in FIG. 2 to establish a reverse speed ratio and eight forward speed ratios. Thus, the SOWBC 68 is switched to the position of FIG. 4 in the reverse speed ratio (with switch 69 in the position shown in FIG. 6), switched to the position of FIG. 3 in the first through fifth forward speed ratios (with switch in the position 69A), and freewheels in the position of FIG. 3 in the sixth through eighth forward speed ratios.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission for a vehicle comprising:
an input member;
an output member;
a stationary member;
a first, a second, a third, and a fourth planetary gear set, each planetary gear set having a first, a second, and a third member; wherein the input member is connected for common rotation with one of the members of the planetary gear sets and the output member is connected for common rotation with another of the members of the planetary gear sets;
a first interconnecting member connecting the first member of the first planetary gear set for common rotation with the first member of the second planetary gear set;
a second interconnecting member connecting the second member of the first planetary gear set for common rotation with the first member of the fourth planetary gear set;
a third interconnecting member connecting the second member of the second planetary gear set for common rotation with the first member of the third planetary gear set;
a fourth interconnecting member connecting the second member of the third planetary gear set for common rotation with the second member of the fourth planetary gear set;
a first brake selectively engagable to ground the first member of the first planetary gear set to the stationary member;
a first, a second, and a third rotating clutch each selectively engagable to connect a different respective pair of the members of the planetary gear sets for common rotation;
a selectable one-way braking clutch configured to brake in one rotational direction and to be selectively reversible to brake in an opposite rotational direction;
wherein the first brake, the first rotating clutch, the second rotating clutch, the third rotating clutch and the selectable one-way braking clutch are engaged in combinations of three to establish the reverse speed ratio and eight forward speed ratios between the input member and the output member;
wherein the selectable one-way braking clutch is configured to be selectively operable in a first mode in the reverse speed ratio and in three of said forward speed ratios; wherein the selectable one-way braking clutch locks in one direction of rotation and freewheels in an opposing direction of rotation in the first mode, and thereby brakes rotation of the third member of the first planetary gear set when the transmission is in the reverse speed ratio and allows rotation of the third member of the first planetary gear set in said three of said forward speed ratios; wherein the selectable one-way braking clutch is switchable to a second mode in the other five of said eight forward speed ratios; and wherein the selectable one-way braking clutch brakes rotation of the third member of the first planetary gear set in both directions of rotation in the second mode.

2. The transmission of claim 1, wherein the first rotating clutch connects the third member of the second planetary gear set for common rotation with one of the second member or the third member of the fourth planetary gear set;

wherein the second rotating clutch connects the third member of the third planetary gear set for common rotation with the third member of the fourth planetary gear set; and wherein the third rotating clutch connects the second member of the second planetary gear set for common rotation with the second member of the fourth planetary gear set.

3. The transmission of claim 1, wherein all of the planetary gear sets are simple planetary gear sets.

4. The transmission of claim 1, wherein the first, second, and fourth planetary gear sets are simple planetary gear sets, and the third planetary gear set is a double pinion-type planetary gear set.

5. The transmission of claim 1, wherein the selectable one-way braking clutch is the only selective connection between the third member of the first planetary gear set and the stationary member.

6. The transmission of claim 1, wherein the first rotating clutch connects the third member of the second planetary gear set for common rotation with one of the second member or the third member of the fourth planetary gear set;

wherein the second rotating clutch connects the third member of the third planetary gear set for common rotation with the third member of the fourth planetary gear set; and wherein the third rotating clutch connects the second member of the second planetary gear set for common rotation with the third member of the fourth planetary gear set.

7. The transmission of claim 6, wherein the input member is connected for rotation with the third member of the second planetary gear set, and the output member is connected for rotation with the one of the second member or the third member of the fourth planetary gear set.

8. A multi-speed transmission for a vehicle comprising:
an input member;
an output member;
a stationary member;
a first, a second, a third, and a fourth planetary gear set, each having a sun gear member, a carrier member and a ring gear member; wherein the input member is connected for common rotation with the carrier member of the second planetary gear set; wherein the output member is connected for common rotation with the carrier member of the fourth planetary gear set;
a first interconnecting member connecting the sun gear member of the first planetary gear set with the sun gear member of the second planetary gear set;
a second interconnecting member connecting the carrier member of the first planetary gear set with the ring gear member of the fourth planetary gear set;
a third interconnecting member connecting the ring gear member of the second planetary gear set with the sun gear member of the third planetary gear set;
a fourth interconnecting member connecting the ring gear member of the third planetary gear set with the one of the members of the fourth planetary gear set not connected with the second interconnecting member;
a first brake selectively engagable to ground the sun gear member of the first planetary gear set to the stationary member;
a first, a second, and a third rotating clutch each selectively engagable to connect a different respective pair of the members of the planetary gear sets for common rotation;
a selectable one-way braking clutch; wherein the first brake, the first rotating clutch, the second rotating clutch, the third rotating clutch, and the selectable one-way braking clutch are engageable in different combinations of three to establish a reverse speed ratio and a first, a second, a third, a fourth, a fifth, a sixth, a seventh, and an eighth forward speed ratio between the input member and the output member; wherein the selectable one-way braking clutch is configured to brake the ring gear member of the first planetary gear set in one rotational direction and freewheel in an opposite rotational direction in the reverse speed ratio and in the sixth, the seventh, and the eighth forward speed ratio and is selectively reversible to brake rotation of the ring gear member of the first planetary gear set in the opposite rotational direction in the first, the second, the third, the fourth, and the fifth forward speed ratios.

9. The transmission of claim 8, wherein the first rotating clutch connects the carrier member of the second planetary gear set for common rotation with the sun gear member of the fourth planetary gear set;

wherein the second rotating clutch connects the carrier member of the third planetary gear set for common rotation with one of the carrier member of the fourth planetary gear set or the sun gear member of the fourth planetary gear set; and wherein the third rotating clutch connects the sun gear member of the third planetary gear set for common rotation with the sun gear member of the fourth planetary gear set.

10. The transmission of claim 8, wherein the fourth interconnecting member connects the ring gear member of the third planetary gear set for common rotation with the carrier member of the fourth planetary gear set.

11. The transmission of claim 8, wherein the fourth interconnecting member connects the ring gear member of the third planetary gear set for common rotation with the sun gear member of the fourth planetary gear set.

12. The multi-speed transmission of claim 8, wherein the selectable one-way braking clutch is the only brake selectively connecting the ring gear member of the first planetary gear set to the stationary member.

* * * * *